Patented Aug. 15, 1950

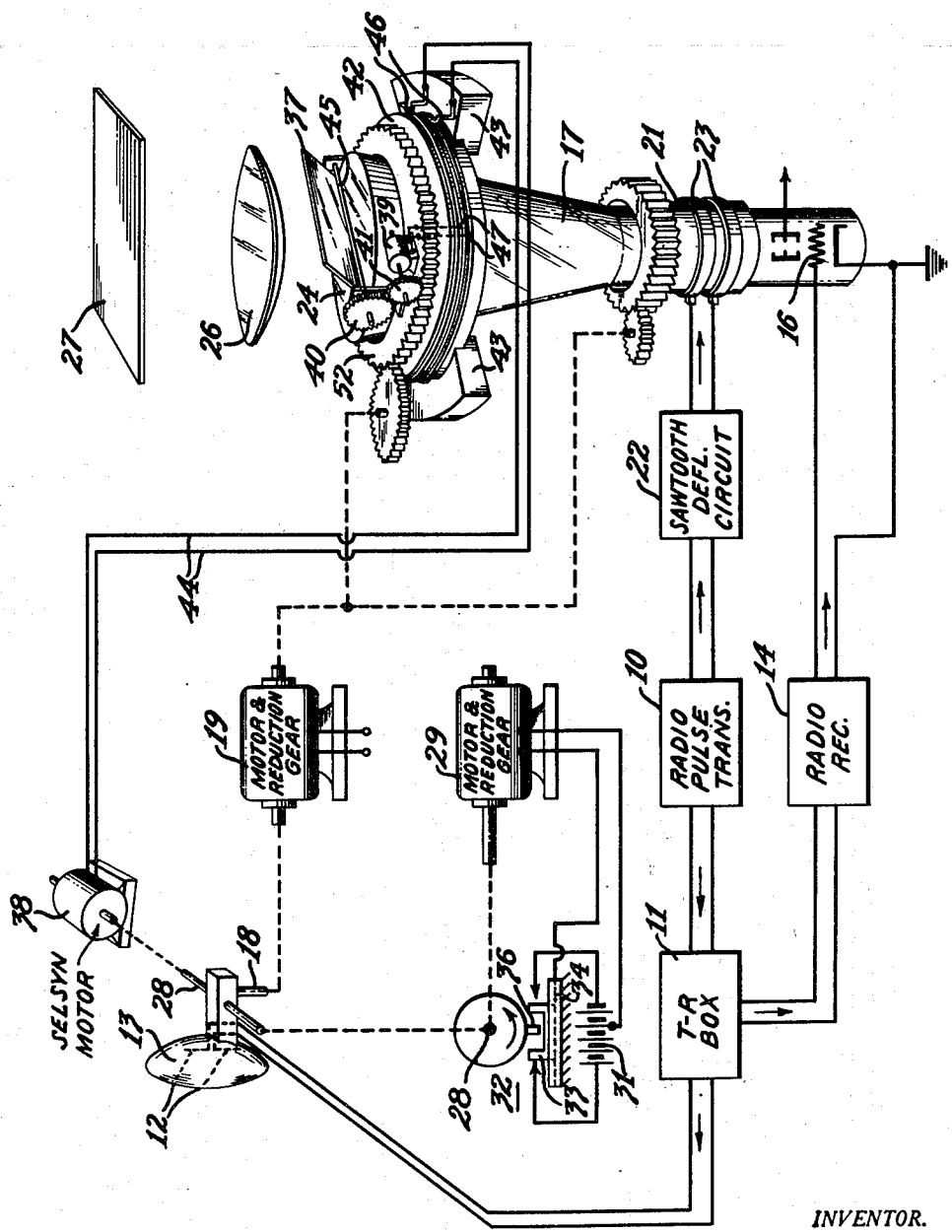

2,518,968

UNITED STATES PATENT OFFICE 2,518,968

RADAR SYSTEM PROVIDING PLAN POSITION INDICATOR AND ELEVATION VIEWS

Irving Wolff, Princeton, N. J., assignor to Radio Corporation of America, a corporation of Delaware Application March 27, 1946, Serial No. 657,419

5 Claims. (Cl. 343—11)

My invention relates to pulse-echo radar or radio locator systems and particularly to systems for obtaining three dimensional information.

An object of the invention is to provide an improved method of and means for obtaining information as to distance, azimuth and elevation of aircraft.

A further object of the invention is to provide an improved radar system of the plan-position-indicator or P. P. I. type which gives elevation information in addition to the distance and azimuth information.

According to a preferred embodiment of the invention, radio pulses are radiated from a directional antenna that is rotated in azimuth at a comparatively slow rate while it is tilted in elevation at a comparatively fast rate. The reflected pulses are supplied to the control grid of a cathode ray tube on which the P. P. I. indication is to appear. The cathode ray of the tube is deflected radially in synchronism with the pulse transmission by means of a deflecting yoke that is rotated in synchronism with the rotation of the antenna in azimuth. Thus a P. P. I. view is produced on the screen end of the cathode ray tube, the plan position of a pulse reflecting aircraft being shown by a spot on a phosphorescent screen which is of the short persistence type.

In order to obtain information as to the height of the aircraft, a partially reflecting and partially transmitting mirror such as a half-silvered mirror or the like is supported above the screen end of the cathode ray tube so that it may be rotated with the deflecting yoke and simultaneously tilted in synchronism with the tilting of the antenna in elevation. Thus, looking at the mirror from the side, a spot on the tube screen will appear to be at a height or elevation depending upon the tilt of the mirror, which, in turn, depends upon the tilt of the directive antenna.

A long persistence screen is positioned above the screen end of the cathode ray tube and a lens system is provided for projecting the spots appearing on the tube screen upon the long persistence screen. Thus, by looking down on the long persistence screen, an observer may view a complete P. P. I. picture showing the plan position of aircraft within the range of the equipment. At the same time, as described above, a side view showing aircraft elevation is provided by the tilting mirror and the fast persistence screen.

The invention will be better understood from the following description taken in connection with the accompanying drawing in which the single figure is a block diagram and perspective view showing one embodiment of the invention.

The drawing shows a pulse-echo radar system comprising a radio pulse transmitter 10 that supplies radio pulses through an antenna duplexer or T-R box 11 to a directive antenna 12 from which the pulses are radiated. In the example shown, the antenna 12 is a dipole which is mounted in a parabolic reflector 13. The T-R box may be of the type described, for example, in application Serial No. 491,963, filed June 23, 1943, and entitled Radio Transmitter-Receiver Automatic Switching System, now Patent No. 2,412,315, issued December 10, 1946, or in Wireless World for December 1945, page 304.

Any pulses reflected by aircraft are picked up by the antenna 12 and supplied through the T-R box 11 to a receiver 14. Demodulated or video frequency pulses are supplied from the receiver 14 to the control grid 16 of a cathode ray tube 17.

The antenna 12 is rotated in azimuth about a vertical axis 18 by means of a motor 19. The cathode ray tube 17 is provided with a deflecting yoke 21 which is rotated by means of the motor 19 in synchronism with the rotation of the antenna in azimuth.

A sawtooth wave deflecting circuit 22, which is synchronized with the pulse transmission, supplies sawtooth current to the deflecting yoke 21 through slip rings 23. Thus, the cathode ray is deflected radially from the center of the cathode ray tube as the yoke 21 is rotated. The system thus far described would produce the usual P. P. I. picture or image on a phosphorescent screen 24 on the end of the tube 17 except for the fact that the screen 24 is made to have short persistence for a reason that will become apparent. Such a screen is made of short decay time fluorescent material. In order to obtain a full 360 degree P. P. I. image that is visible at one time, the information appearing on the screen 24 is projected by a lens system 26 upon a long persistence screen 27. Such a screen is made of long decay time fluorescent material. In this way the customary P. P. I. picture may be viewed on the screen 27. Merely by way of example, it may be mentioned that the short persistence screen 24 may be a blue-light emitting screen of the composition ZnS:Ag(.01) and the long persistence screen 27 may be a yellow-light emitting screen of the composition ZnS:CdS(14):Cu(.01)

The antenna 12 may be tilted up and down at a comparatively rapid rate about an axis 28 by means of a reversible motor 29. The motor 29 is supplied with power from a battery 31 through a limit switch 32 that reverses the polarity of the power supply to the motor at the upper limit of antenna tilt and at the lower limit of antenna tilt. In the example shown, the switch 32 comprises a fork portion 33 that is slidably mounted in a supporting member 34. As the shaft 28 rotates to a limit position, a pin 36 moves the fork 33 into engagement with one switch contact point and out of engagement with the other switch contact point.

A partially reflecting and partially transmitting mirror 37 is supported above the short persistence screen 24 so that it may be tilted between a vertical position and a position of 45 degrees with respect to the screen 24. The mirror 37 is tilted in synchronism with the tilting of the antenna 12 by means of Selsyn motors 38 and 39, for example. The motor 38 is coupled to the shaft 28 while the motor 39 is coupled through gears 40 and 41 to the pivot shaft 45 of the mirror 37. The pivot shaft 45 passes through or intersects the longitudinal axis of the tube 17.

Both the mirror 37 and the Selsyn motor 39 may be supported by means of a ring 42 of insulating material which is rotatably mounted on bearing blocks 43. Current from the Selsyn motor 38 is supplied over conductors 44 and through brushes 46 and slip rings 47 to the Selsyn motor 39.

When the antenna 12 is tilted to its position of maximum elevation, the mirror 37 is tilted to its 45 degree position. If at this time there is an aircraft in the path of the radio beam so that a spot is produced on the screen 24, this spot as seen in the mirror when viewed from the side will appear to be at a maximum altitude. Preferably the mirror 37 is tilted at a rate at least equal to persistence of vision but this is not essential.

While the mirror 37 is being tilted rapidly, it is also being rotated comparatively slowly in synchronism with the rotation of the antenna 12 and the deflecting yoke 21. This may be accomplished by driving the supporting ring 42 by the motor 19 through gears 51 and 52.

In using the equipment for detecting the approach of enemy aircraft, for example, several observers may watch the screens. One observer may watch the P. P. I. picture on the screen 27 while two or more observers may be stationed around the cathode ray tube 17 to watch the elevation view in the mirror 37 as it rotates slowly into position for each "elevation" observer.

The invention is not limited to a system employing a radar system of the pulse-echo type. If desired a frequency modulated or FM type of radar system, for example, may be employed. A method by which distance information may be obtained by an FM radar system is described and claimed in my copending application Serial No. 452,990, filed July 31, 1942, and entitled Distance Measuring Apparatus, now Patent No. 2,422,157, issued June 10, 1947.

I claim as my invention:

1. A radio locator system comprising a directive antenna having a directional radiation pattern, means for radiating radio energy from said antenna, means for scanning in elevation with said radiation, a cathode ray indicator tube having a short persistence luminescent screen and an electron gun for directing an electron beam against said screen and also having a control electrode for causing said electron beam to produce an indication in response to a signal being applied to said control electrode, means for receiving and demodulating said radio energy after reflection and for then applying the resulting signal to said control electrode, means for deflecting said electron beam along a time axis, a long persistence luminescent screen and means for projecting thereupon the view produced on said short persistence screen whereby a picture containing distance information may be viewed on said long persistence screen, a partially reflecting and partially transmitting mirror pivotally mounted adjacent to said short persistence screen, and means for tilting said mirror about its pivot axis in synchronism with said scanning in elevation.

2. A pulse-echo radio locator system comprising a directive antenna having a directional radiation pattern, means for radiating radio pulses from said antenna, means for scanning in elevation with said radiation, a cathode ray indicator tube having a short persistence luminescent screen and an electron gun for directing an electron beam against said screen and also having a control electrode for causing said electron beam to produce an indication in response to a pulse being applied to said control electrode, means for receiving and demodulating said radio pulses after reflection and for then applying them to said control electrode, means for deflecting said electron beam in synchronism with the radiation of said pulses, a long persistence luminescent screen and means for projecting thereupon the view produced on said short persistence screen whereby a picture containing distance information may be viewed on said long persistence screen, a partially reflecting and partially transmitting mirror pivotally mounted adjacent to said short persistence screen with the pivot axis of the mirror adjacent to the screen, and means for tilting said mirror about its pivot axis in synchronism with said scanning in elevation and with the tilting of the mirror lying between the limits of 90 degrees and 45 degrees with respect to the fast persistence screen.

3. A pulse-echo radio locator system comprising a directive antenna having a conical or pencil-like radiation pattern, means for radiating radio pulses from said antenna, means for scanning in azimuth with the radiation from said antenna at a comparatively slow rate, means for simultaneously scanning in elevation with said radiation at a comparatively fast rate, a cathode ray indicator tube having a short persistence luminescent screen and an electron gun for directing an electron beam against said screen and also having a control electrode for modulating the intensity of said electron beam, means for receiving and demodulating said radio pulses after reflection and for then applying them to said control electrode, means for providing a deflecting field for deflecting said electron beam radially in synchronism with the radiation of said pulses, means for rotating said deflecting field in synchronism with said scanning in azimuth, a long persistence luminescent screen and means for projecting thereupon the view produced on said short persistence screen whereby a picture containing distance and azimuth information may be viewed on said long persistence screen, a partially reflecting and partially transmitting mirror pivotally mounted adjacent to said short persistence screen with the pivot axis of said mirror adjacent to the screen and intersecting the longitudinal axis of the cathode ray tube, means for rotating said mirror about said longitudinal axis and in synchronism with said scanning in azimuth, and means for tilting said mirror about its pivot axis in synchronism with said scanning in elevation and with the tilting of the mirror lying between the limits of 90 degrees and 45 degrees with respect to the fast persistence screen.

4. A pulse-echo radio locator system comprising a directive antenna having a conical or pencil-like radiation pattern, means for radiating radio pulses from said antenna, means for rotating said radiation pattern in azimuth, at a comparatively slow rate, means for simultaneously tilting said radiation pattern in elevation at a comparatively fast rate, a cathode ray indicator tube having a short persistence luminescent screen and an electron gun for directing an electron beam against said screen and also having a control electrode for modulating the intensity of said electron beam, means for receiving and demodulating said radio pulses after reflection and for then applying them to said control electrode, means for providing a deflecting field for deflecting said electron beam radially in synchronism with the radiation of said pulses, means for rotating said deflecting field in synchronism with said rotation of the radiation pattern, a long persistence luminescent screen and means for projecting thereupon the view produced on said short persistence screen whereby a P. P. I. picture may be viewed on said long persistence screen, a partially reflecting and partialy transmitting mirror pivotally mounted adjacent to said short persistence screen with the pivot axis of said mirror adjacent to the screen and intersecting the longitudinal axis of the cathode ray tube, means for rotating said mirror about said longitudinal axis and in synchronism with the rotation of said antenna and deflecting yoke, and means for tilting said mirror about its pivot axis in synchronism with the tilting of said radiation pattern and with the tilting of the mirror lying between the limits of 90 degrees and 45 degrees with respect to the fast persistence screen.

5. A radio locator system comprising a directive antenna having a directional radiation pattern, means for radiating radio energy from said antenna, means for scanning along one coordinate comparatively slowly with said radiation, means for scanning along a second coordinate comparatively rapidly with said radiation, a cathode ray indicator tube having a short persistence luminescent screen and an electron gun for directing an electron beam against said screen and also having a control electrode for causing said electron beam to produce an indication in response to a signal being applied to said control electrode, means for receiving said radio energy after reflection and for then applying the received signal to said control electrode, means for deflecting said electron beam along a time axis and for also deflecting said electron beam in synchronism with said slow scan whereby indications of all reflecting objects in the field of scan of said antenna appear on said short persistence screen, a long persistence luminescent screen and means for projecting thereupon the view produced on said short persistence screen whereby there appears on said long persistence screen an indication of the position of each reflecting object in terms of distance from the transmitter and in terms of the coordinate of the slow scan, means comprising an optical system that is synchronized with said fast scan for selecting a section of the slow scan and for producing an indication of the position of each reflecting object in terms of distance from the transmitter and in terms of the coordinate of the fast scan.

IRVING WOLFF.

REFERENCES CITED

The following references are of record in the file of this patent:

UNITED STATES PATENTS

| Number | Name | Date |
|---|---|---|
| 2,408,848 | Hammond | Oct. 8, 1946 |
| 2,409,456 | Tolson et al. | Oct. 15, 1946 |